United States Patent Office 3,175,002
Patented Mar. 23, 1965

3,175,002
FLUORINATED CARBOXAMIDE AZINES
Edward Karcher Gladding, New Castle, Del., and David Carroll Remy, Lansdale, Pa., assignors to E. I. du Pont de Nemours and Company, Wilmington, Del., a corporation of Delaware
No Drawing. Original application June 28, 1960, Ser. No. 39,232, now Patent No. 3,102,889, dated Sept. 3, 1963. Divided and this application Nov. 13, 1962, Ser. No. 237,380
2 Claims. (Cl. 260—564)

The present invention is directed to new fluorocarbon compounds exhibiting outstanding thermal stability which are significantly useful as heat transfer media.

Fluorinated organic compounds are acquiring increasing technical and commercial importance.

It is an object of the present invention to provide new fluorocarbon compounds having excellent thermal stability. It is a further object to provide new heterocyclic compounds having highly fluorinated side chains. It is a still further object to provide amide azine compounds having highly fluorinated substituents. It is still an additional object to provide processes for making these compounds.

These and other objects will become apparent in the following description and claims.

More specifically, the present invention is directed to compounds having the structure

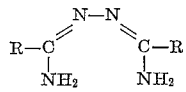

wherein R is a perfluoroalkyl, ω-hydroperfluoroalkyl, or ω-chloroperfluoroalkyl radical; with the proviso that there are at least 3 carbon atoms in R.

The term "perfluoroalkyl radical" used heretofore has the customary meaning; that is, it refers to an alkyl radical wherein all the hydrogen atoms have been replaced by fluorine atoms. A perfluoroalkyl radical, accordingly, contains only carbon and fluorine atoms; the carbon atoms therein are joined by carbon-to-carbon single bonds; each fluorine atom therein is joined only to a carbon atom. The ω-hydroperfluoroalkyl radicals and the ω-chloroperfluoroalkyl radicals are identical to perfluoroalkyl radicals except that a single hydrogen or a single chlorine atom, respectively, is present and is located at the end of the radical chain.

Representative examples of the perfluoroacylamide azines of the present invention include: heptafluorobutyramide azine; perfluorovaleramide azine; perfluorocaproamide azine; perfluorocaprylamide azine; perfluorocapramide azine; perfluorolauramide azine; perfluoromyristamide azine; ω-hydroperfluorovaleramide azine; ω-hydroperfluorononylamide azine; ω-chloroperfluorovaleramide azine; ω-chloroperfluorolauramide azine; and ω-chloromyristamide azine.

The perfluoroacylamide azines (IX) of this invention are made by heating the known perfluoroacylamidrazones (VII) at atmospheric pressure at temperatures ranging from about 95° C. to about 200° C.

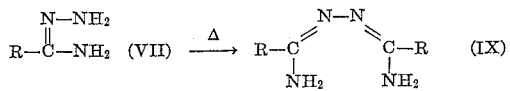

When gas evolution ceases, heating is continued for about another hour. The residue obtained is worked up by solution in glacial acetic acid and addition, in turn, of concentrated nitric acid and water at room temperature and atmospheric pressure. The precipitated product is collected by filtration.

It is to be understood that the ω-chloroperfluoroalkyl and the ω-hydroperfluoroalkyl substituted compounds of the present invention can be made by the procedures given for the analogous perfluoroalkyl compound.

A representative example illustrating the present invention follows.

EXAMPLE

*Heptafluorobutyramide azine*

A round-bottom flask was equipped with a water-cooled condenser whose lower end contained a plug of glass wool. Two Dry Ice traps were connected in series to the upper end of the condenser. The flask was charged with 11.62 g. (0.0513 mole) of heptafluorobutyroamidrazone and then was heated up to 170° C. over a 30-minute period. Gas evolution became brisk at about 140° C. and continued for 15–20 minutes. The reaction mixture was held at 170° C. for one hour after the brisk gaseous evolution had subsided. The residue in the flask was dissolved in 20 ml. of glacial acetic acid, and then 15 ml. of concentrated nitric acid was added slowly. The solution immediately became a bright pink-red color. After the solution had been stirred for 15 minutes, 250 ml. of water was added, the mixture cooled in ice, and the solid precipitate removed by filtration. The precipitate was dissolved in benzene and this solution was dried over magnesium sulfate. This benzene solution was passed through a chromatographic column prepared from 30 g. of alumina, Grade F–20, and the column was eluted with benzene. Evaporation of 250 ml. of the benzene eluant gave 4.33 g. of white crystals. Recrystallization of this material from a small amount of benzene gave analytically pure heptafluorobutyramide azine, M.P. 51–52°; λ max. (95% ethanol): 272 mμ (E: 15,500).

*Analysis.*—Calcd. for $C_8H_4F_{14}N_4$: C, 22.76; H, 0.96; F, 63.01; N, 13.27; molecular weight, 422.1. Found: C, 22.7, 22.7; H, 1.1, 1.1; F, 62.7, 62.7; N, 13.3, 13.3; molecular weight, 395.

As many apparently widely different embodiments of this invention may be made without departing from the spirit and scope thereof, it is to be understood that this invention is not limited to the specific embodiments thereof except as defined in the appended claims.

This application is a division of our U.S. application, Serial No. 39,232, filed on June 28, 1960, now U.S. Patent 3,102,889.

The embodiments of the invention in which an exclusive property or privilege is claimed are defined as follows:

1. A compound of the formula

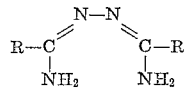

in which compound R is a radical selected from the group consisting of perfluoroalkyl, ω-hydroperfluoroalkyl and ω-chloroperfluoroalkyl radicals, with the proviso that there are from 3 to 13 carbon atoms in said R radical.

2. The compound heptafluorobutyramide azine.

References Cited in the file of this patent
UNITED STATES PATENTS
2,676,985    Husted _____ Apr. 27, 1954